(12) United States Patent
Kuriyama

(10) Patent No.: US 7,152,091 B2
(45) Date of Patent: Dec. 19, 2006

(54) CONTENTS DISTRIBUTING METHOD AND CONTENTS DISTRIBUTING PROGRAM

(76) Inventor: Kinya Kuriyama, 56-14, Enokigaoka, Aoba-ku, Yokohama-shi, Kanagawa, 227-0063 (JP)

( * ) Notice: Subject to any disclaimer, the term of this patent is extended or adjusted under 35 U.S.C. 154(b) by 848 days.

(21) Appl. No.: 10/205,495

(22) Filed: Jul. 26, 2002

(65) Prior Publication Data
US 2003/0033380 A1 Feb. 13, 2003

(30) Foreign Application Priority Data
Jul. 27, 2001 (JP) ............................. 2001-227788

(51) Int. Cl.
*G06F 13/00* (2006.01)
*G06F 12/00* (2006.01)

(52) U.S. Cl. .................................... 709/203

(58) Field of Classification Search ................ 705/1, 705/14; 709/203
See application file for complete search history.

(56) References Cited

U.S. PATENT DOCUMENTS 6,314,451 B1 * 11/2001 Landsman et al. .......... 709/203

FOREIGN PATENT DOCUMENTS

JP 10-320336 12/1998
WO WO 97/15020 4/1997

* cited by examiner

*Primary Examiner*—Robert B. Harrell
(74) *Attorney, Agent, or Firm*—Griffin & Szipl, P.C.

(57) ABSTRACT

The purpose of the invention is to present advertisements properly to users. To realize this, a web server sends necessary related information, which includes links for download, to a client machine in accordance with a download request of the client machine. When the client machine requests start of download, by use of the link the web server, in response to the start of download request, distributes designated predetermined contents, and an advertisement supply server distributes predetermined advertisement contents. When there occurs an instruction from the client machine of forced termination of distribution of advertisement contents by the advertisement supply server, the advertisement distributing server terminates distribution of advertisement contents and sends a forced termination flag, which shows forced termination of distribution, to the web server. The web server, in response to reception of the flag, ceases distribution of contents.

12 Claims, 9 Drawing Sheets

CONTENTS DISTRIBUTING METHOD AND CONTENTS DISTRIBUTING PROGRAM

This application claims priority from Japanese Patent Application No. 2001-227788, filed Jul. 27, 2001.

FIELD OF THE INVENTION

This invention relates to systems for distributing contents, such as advertisements, to client machines that are accessing servers etc. through the Internet.

BACKGROUND OF THE INVENTION

Most contents on the Internet have banner advertisements thereon that are linked to HPs (home-pages) of sponsors. Users can view advertisement pages linked therefrom by clicking banner advertisements. Thus, it is possible to notify users of corporate advertisements and advertisements of new products.

Many sites have sponsors posting advertisement banners thereon, and collect advertising rates therefor, and use advertising as working money for the sites. However, in recent years, the clicking rate of banner advertisements is getting extremely small, and from a sponsor view point, the attractiveness as to posting advertisements on such sites is getting small. Furthermore, since the number of posting advertisement banners is decreasing, there are many cases in which sites themselves are not workable.

On the other hand, due to popularization of xDSL and optical fibers, the download of large capacity files is possible. Also, streaming reproduction of motion pictures is possible.

An object of this invention is to provide a data communication system that can present advertisements properly to users and that is attractive to sponsors and site administrators.

SUMMARY OF THE INVENTION

The object of the invention is accomplished by a distributing method for downloading contents to a client machine that is connected to a network, in a system in which a web server for downloading contents to the client machine of a user, and an advertisement supply server for distributing advertisement contents, are connected through the network, comprising, (a) in the web server, a step of sending necessary related information including links for download with regard to the client machine, in accordance with a download request of the client machine, (b) in the client machine, a step of requesting start of download, by use of a link that is contained in the related information, (c) in the web server, a step of distributing designated predetermined contents to the client machine, in response to the download start request, (d) in the advertisement supply server, a step of distributing predetermined advertisement contents, in response to the download start request, (e) in order to have contents reproduced in the client machine, a step of terminating distribution of advertisement contents to the client machine, in response to an instruction of forced termination of distribution of advertisement contents by the advertisement supply server, from the client machine and of sending a first forced termination flag that shows forced termination of distribution of the advertisement contents to the web server, and, (f) in the web server, a step of ceasing distribution of contents in response to reception of the first forced termination flag.

According to the invention, during download of contents advertisement contents can be reproduced on a screen of a display apparatus of the client machine by, for example, streaming reproduction from the advertisement supply server. Furthermore, in the case where distribution of advertisement contents is forcibly terminated, distribution of contents is terminated herewith. Accordingly, it becomes possible to present advertisement contents to users during downloading. Because users simply view reproduced advertisement contents during download, there occurs no disadvantage from time, and charge, view points to users. Further, since advertisement contents are reliably presented to users, it becomes possible to grasp properly the number of advertisement contents distributed.

In a preferred embodiment of the invention, in the web server, the distributing method further comprises (g) a step of terminating distribution of contents to the client machine in response to an instruction of forced termination of contents distribution by the web server, from the client machine and of sending a second forced termination flag that shows forced termination of distribution of the contents to the advertisement supply server, and (h) in the advertisement supply server, a step of ceasing distribution of advertisement contents in response to reception of the second forced termination flag.

In a more preferred embodiment, the distributing method further comprises, (i) in the advertisement supply server, a step of increasing a count value that shows the number of advertisement contents distribute, on the occasion of distribution of corresponding advertisement contents, and (j) a step of decreasing the count value, in response to reception of forced termination of distribution of the advertisement contents, or reception of the second forced termination flag. Thus, only when advertisement contents are properly distributed, does it become possible to increase the count that shows the number of advertised contents distributed.

In another preferred embodiment, the distributing method further comprises, in the web server, a step of sending a distribution completion flag that shows completion of distribution of the contents to the advertisement supply server, in the advertisement supply server, a step of detecting accession of the distribution completion flag, when distribution of certain advertisement contents is completed, and a step of sending the same or other advertisement contents to the client machine, in the case where the distribution completion flag is not reached. Thus, for example, on the occasion of download of large capacity contents, it becomes possible to sequentially distribute a plurality of advertisement contents.

In a preferred embodiment, the step of sending the related information contains a step of sending information that designates a plurality of linked addresses, and the distributing method further comprises, in the client machine, a step of requesting a start of download to the web server and requesting distribution of advertisement contents to the advertisement supply server. For example, this can be realized by use of extension links of XML.

Alternatively, the distributing method may comprise, in the web server, a step of requesting distribution of advertisement contents to the client machine made to the advertisement supply server in response to the request of download start from the corresponding client machine.

Furthermore, the object of the invention is also accomplished by a distributing program for activating a web server in order to download contents to a client machine that is connected to a network in a system in which a web server for downloading contents to the client machine of a user, and an advertisement supply server for distributing advertisement contents, are connected through the network, characterized in that the distributing program (a) has the web server execute a step of sending necessary related information, including links for download with regard to the client machine, in accordance with a download request from the client machine, (b) a step of receiving a request of download start by use of a link that is contained in the related information received from the client machine, (c) a step of sending designated predetermined contents to the client machine, in response to the request of download start, and (d) a step of ceasing distribution of contents, in response to reception of a first forced termination flag, in the case where the advertisement supply server receives the first forced termination flag that shows forced termination of the advertisement contents, responding to an instruction of forced termination of distribution of advertisement contents from the client machine, in the advertisement supply server that distributes advertisement contents to the client machine by sending contents via the web server.

In a preferred embodiment, the distributing program has the web server further execute (e) a step of terminating distribution of contents to the client machine, in response to an instruction of forced termination of distribution of contents by the web server, from the client machine and sending a second forced termination flag that shows forced termination of distribution of the contents to the advertisement supply server.

BRIEF DESCRIPTION OF THE DRAWINGS

The invention, together with further advantages thereof, is described by reference to the following description taken in conjunction with the accompanying drawings in which.

DETAILED DESCRIPTION OF THE PREFERRED EMBODIMENTS

Figure 1:
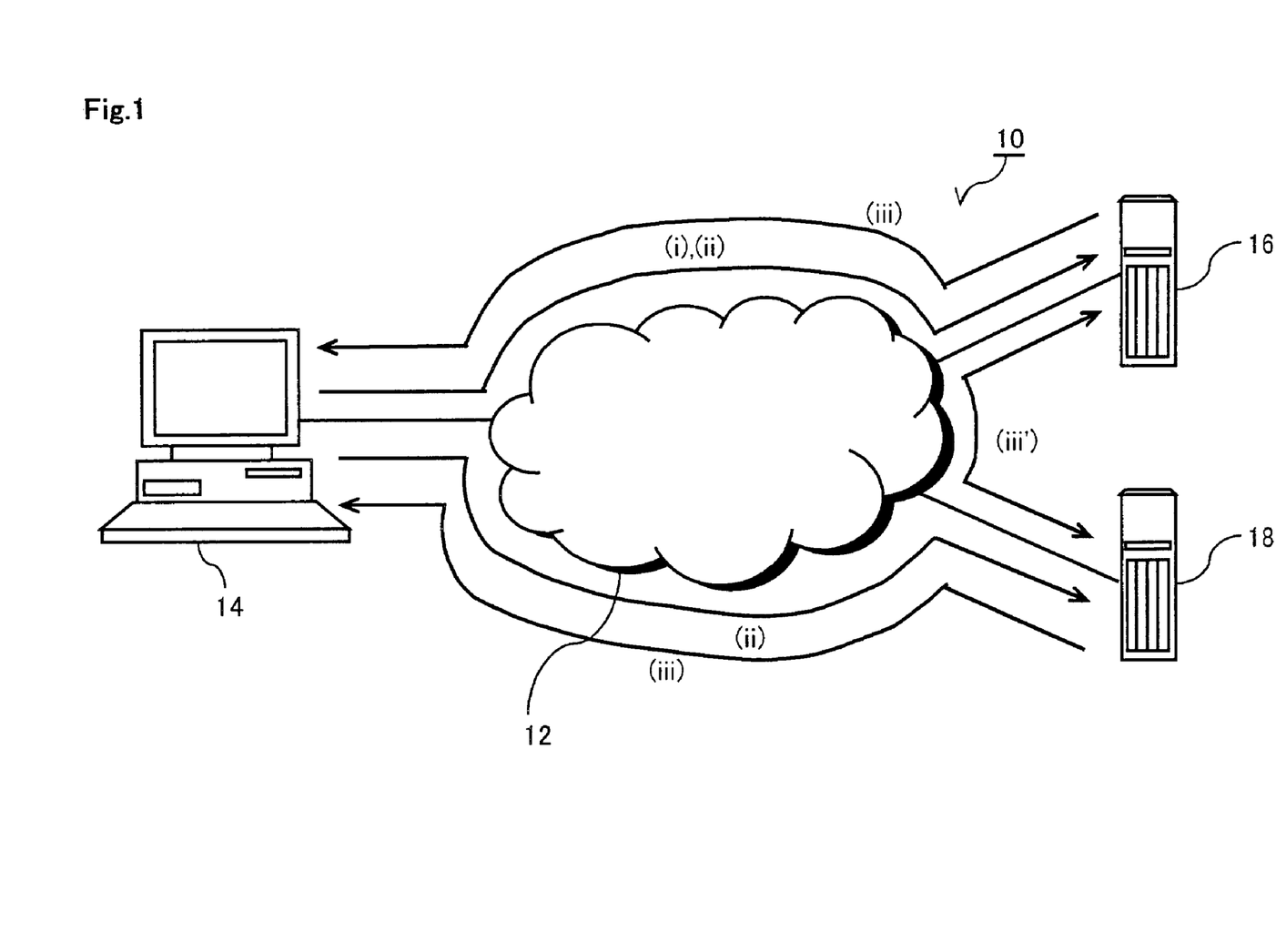
FIG. 1 is a block diagram outlining a data communication system according to the invention.

Hereinafter, preferred embodiments of the present invention will be described with reference to the drawings. FIG. 1 is a block diagram showing an outline of a data communication system 10 according to the invention. As shown in the embodiment of FIG. 1, a client machine 14 is connected to the Internet 12. Also connected to the Internet 12 are a contents server (in this specification, referred to as "web server") 16, which supplies necessary contents in response to a request from the client machine 14, and an advertisement supply server 18 that supplies advertisement contents to the client machine 14 in response to an instruction from, for example, the web server 16.

A general personal computer can be used as the client machine 14, and has a browser and a multimedia player for viewing contents through the Internet 12. In this embodiment, a browser and a multimedia player (for example, a real player (TM), a windows (TM) media player) presently available in the market can be used. In this embodiment, explanation of the case in which contents are viewed by use of the browser will be provided, but it goes without saying that similar processing may be carried out in the case where the invention utilizes the multimedia player.

Figure 2A:
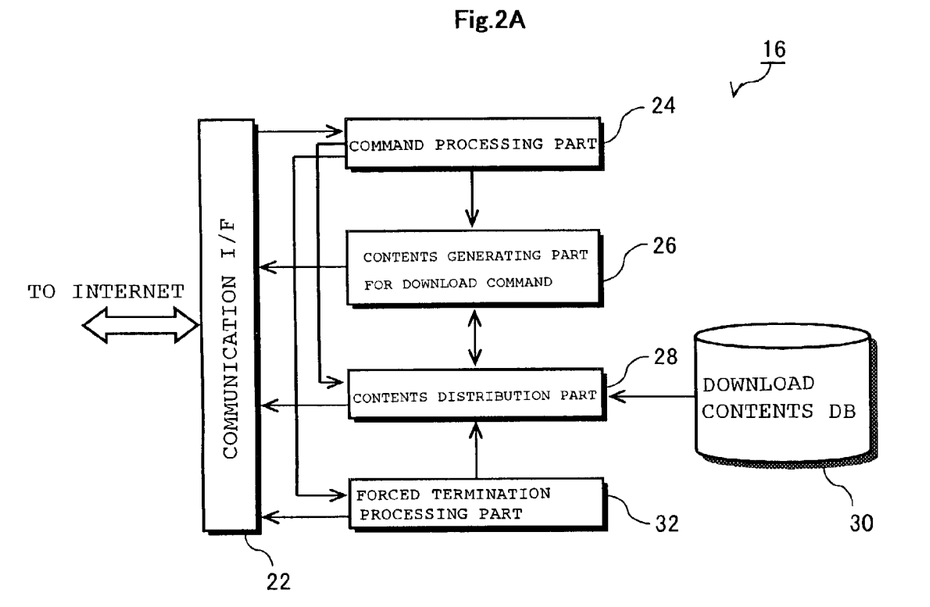
FIG. 2A is a block diagram that shows structure of a web server according to an embodiment of the invention.

FIG. 2A is a block diagram showing structure of the web server 16 according to an embodiment of the invention. As shown in FIG. 2A, the web server 16 has a communication interface (I/F) 22 that controls communication through the Internet 12, a command processing part 24 that receives a command given through the Internet from, for example, the client machine 14 and carries out necessary processing, a contents generating part 26 for download command that generates, for example, a menu page in response to access from the client machine 14, a contents distributing part 28 that carries out necessary processing for distributing contents to the client machine 14, a download contents DB (database) 30 that stores contents, and a forced termination processing part 32 that carries out necessary processing for forcibly terminating download upon instruction from, for example, the client machine 14. In this embodiment, motion pictures, music and still pictures can be distributed from the web server 16 to the client machine 14.

Figure 2B:
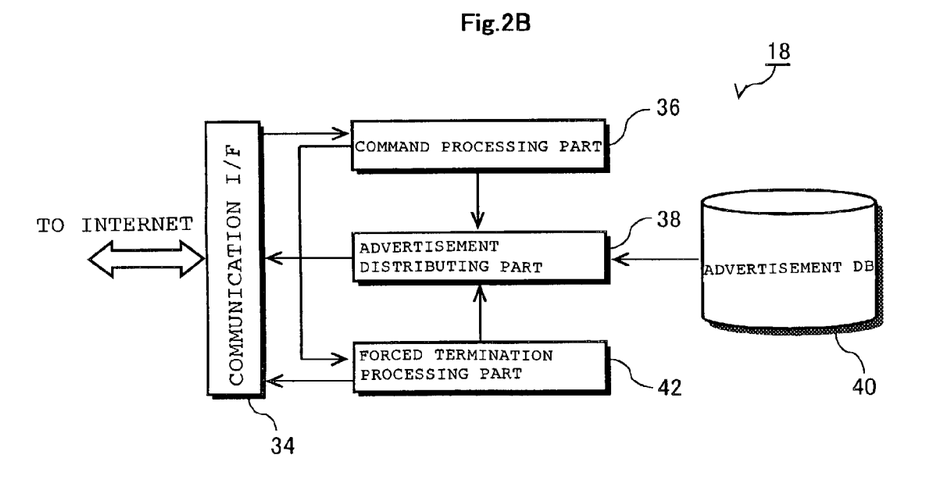
FIG. 2B is a block diagram that shows an advertisement feeding server according to the embodiment of FIG. 2A.

FIG. 2B is a block diagram showing structure of an advertisement distributing server 18 according to an embodiment of the invention. As shown in FIG. 2B, the advertisement distributing server 18 has a communication interface (I/F) 34 that controls communication through the Internet 12, a command processing part 36 that receives a command given through the Internet from, for example, the client machine 14 and carries out necessary processing for distributing advertisements, an advertisement distributing part 38 that carries out processing for distributing advertisement contents to the client machine 14, an advertisement DB (database) 40 that stores advertisement contents, and a forced termination processing part 42 that carries out necessary processing on the occasion of forcibly terminating distribution of advertisements at instruction from, for example, the client machine 14. In this embodiment, advertisement contents may be a motion picture for a given length of time, such as TVCF and one like so-called "GIF" motion picture. However, in accordance with this embodiment, because the number of distribution is counted and stored and based upon this counted and stored distribution number, accounting is carried out to sponsors, it is therefore preferable that advertisement contents may be reproduced simply for the same period of time.

As follows, data communication procedure using the servers as configured above will be described. Basically, in a system 10 according to this embodiment, download of contents is requested from a client machine 14 to the web server 16 (see, symbol (i) of FIG. 1), and an instruction of download start (i.e., an instruction to start download) is sent to the web server 16 and to the advertisement distributing server 18 (see, symbols (i) and (ii) of FIG. 1), and download of contents and distribution of advertisement during downloaded are then carried out (see, symbol (iii) of FIG. 1). In the case of termination of download and forced termination, data communication is carried out between the web server 16 and the advertisement distributing server 18 (see, symbol (iii')). This processing will be explained in detail as follows.

Figure 3:
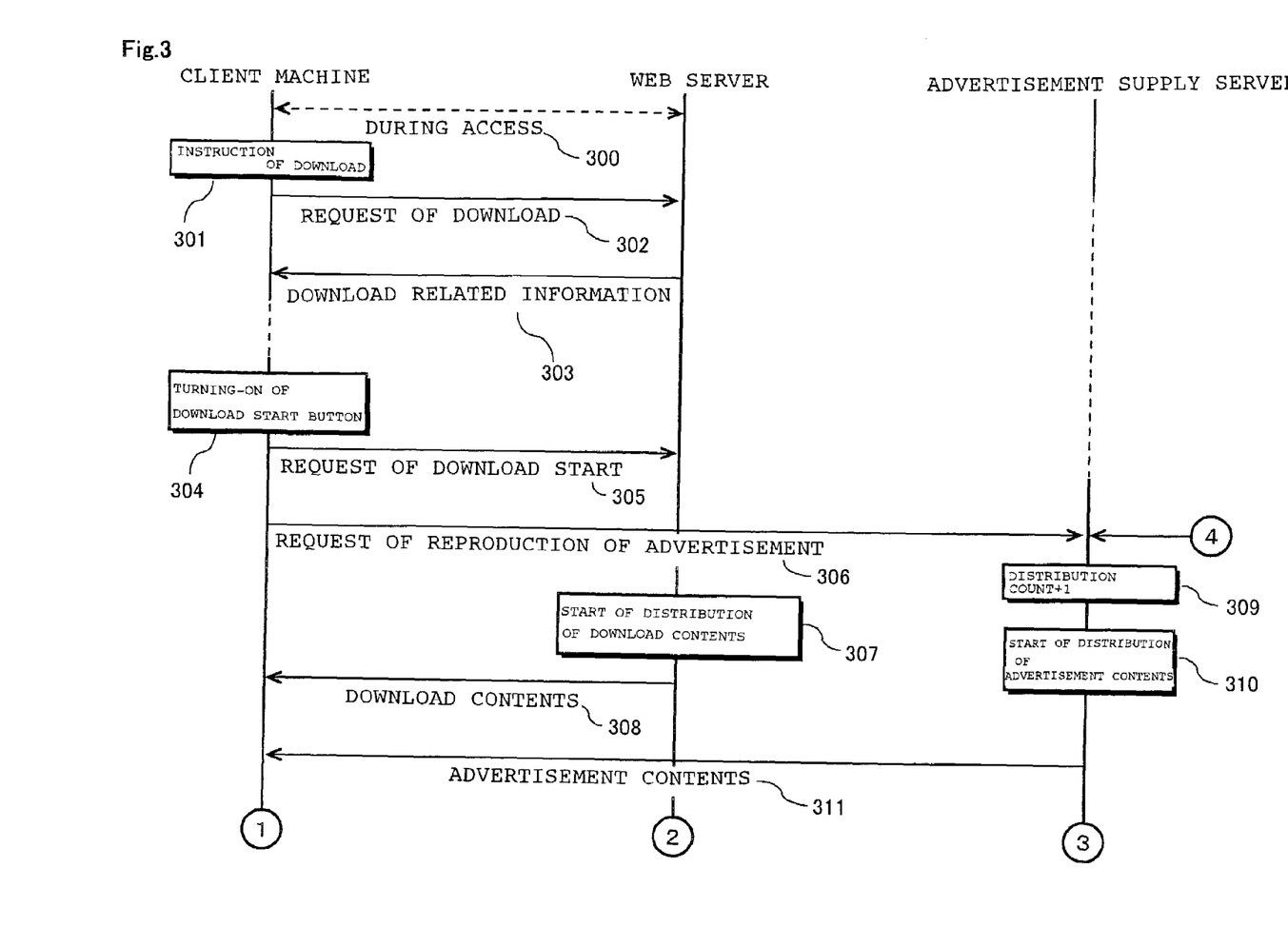
FIG. 3 is a flow chart that shows a data flow from a download request from a client machine to start of contents distribution in an embodiment of the present invention.

FIG. 3 is a flow chart showing a data flow beginning from a download request from a client machine to the start of contents distribution. As shown in FIG. 3, under the circumstances where the client machine 14 and the web server 16 are in a state of accessing each other (see, step 300), in the case where a user operates a key of the client machine 14 to, for example, designate desired contents from a download list displayed on the screen of the display apparatus in accordance with step 301, a download request is sent to the web server 16, in accordance with step 302, from the client machine 14. In the web server 16, the command processing part 24 responds to reception of the download request and activates the contents generating part 26 for generating a download command. The contents generating part 26 for a download command sends information relating to a download, for example, information showing linked addresses for downloading contents to the client machine 14 in accordance with step 303.

Figure 7A:
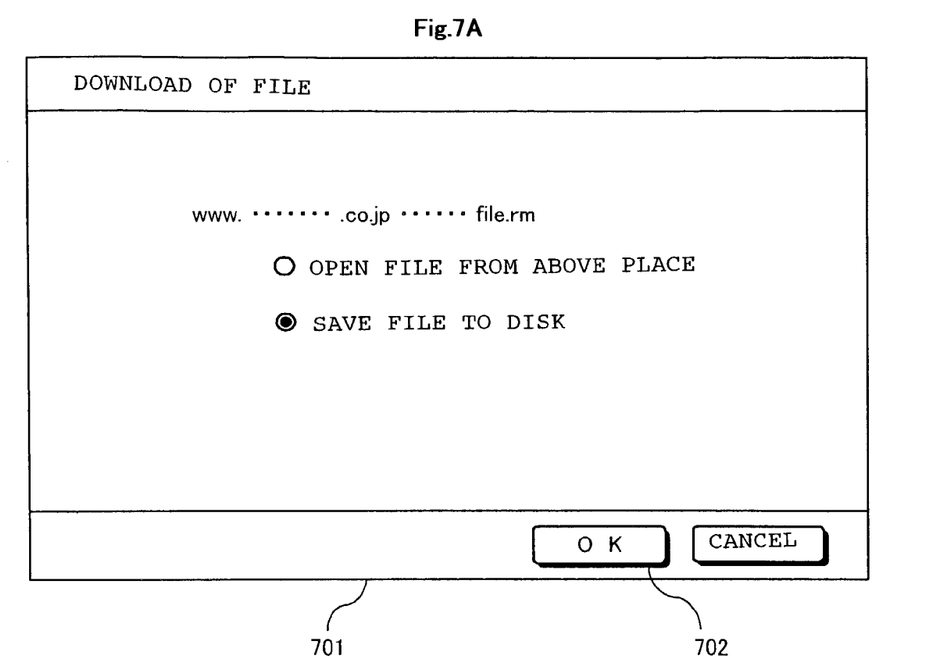
FIGS. 7A and 7B are views showing examples of windows displayed on a screen of a display apparatus of the client machine, respectively, in accordance with an embodiment of the invention.
Figure 7B:
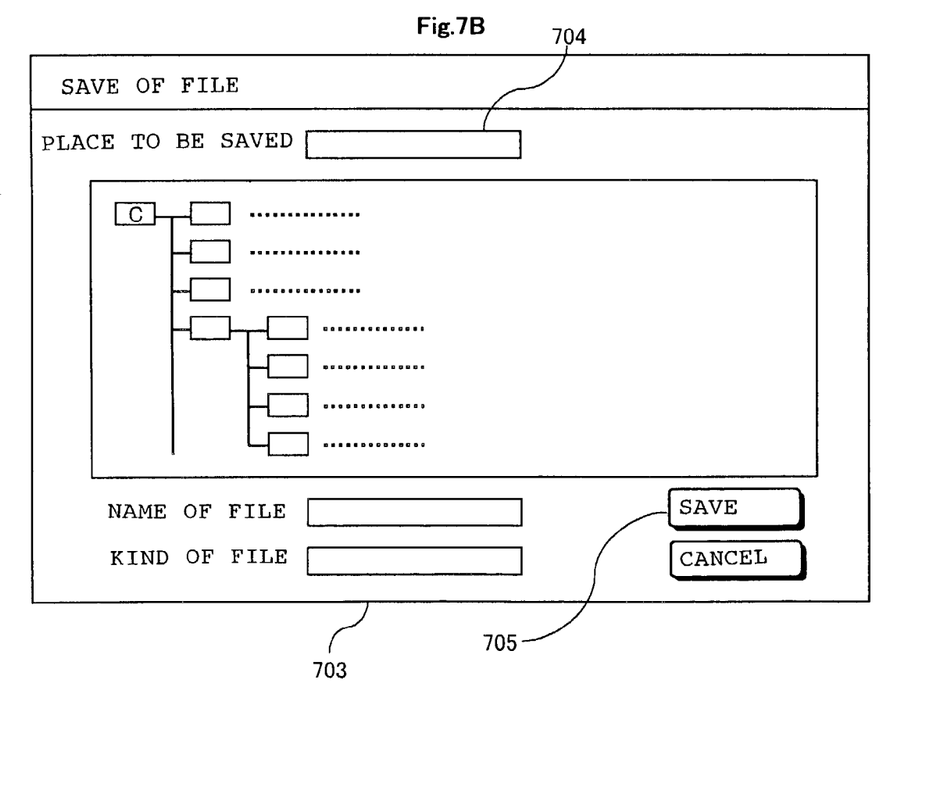

For example, on the screen of the display apparatus of client machine 14, as shown in FIG. 7A, a window is displayed by the browser. In this example, a user, in reference to the window 701, designates "save" of a file and thereafter, turns on an "OK" button 702. Thus, as shown in FIG. 7B, a window 703 is displayed that includes an input column 704 for saving of files to a designated place to be saved. The structure of the window that a user sees is almost the same as the structure used in the past.

Subsequently, a user operates the input apparatus of the client machine 14, and turns on a download start button (see, e.g., in FIG. 7B, "SAVE" button 705) in accordance with step 304 so that the necessary command is sent out. In this embodiment, by using extension links of XML a plurality of linked addresses can be designated. Accordingly, the "SAVE" button 705, the web server 16 and the advertisement supply server 18 are connected with execution of a link designation file. Thus, by turning on the "SAVE" button in step 304, a download start request is sent to the web server 16 in accordance with step 305, and an advertisement reproduction request is sent to the advertisement supply server 18 in accordance with step 306.

Figure 8A:
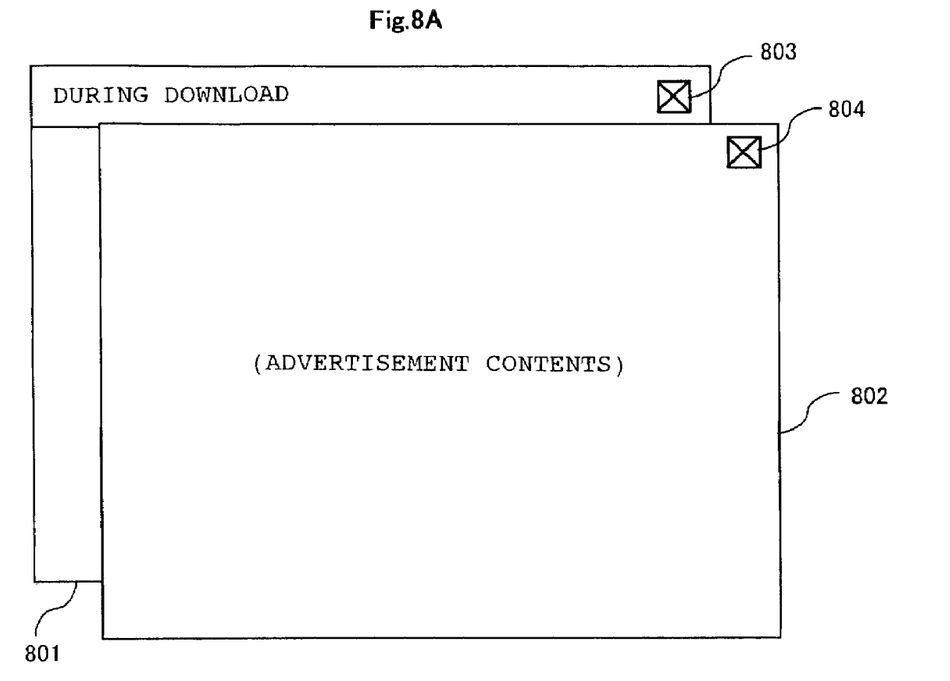
FIGS. 8A and 8B are views showing examples of windows displayed on a screen of a display apparatus of the client machine, respectively, in accordance with an embodiment of the invention.

The command processing part 24 of the web server 16, when it receives the download start request, activates the contents distributing part 28, and the contents distributing part 28 responds to this activation and starts distributing designated download contents in accordance with steps 307 and 308. On the other hand, the command processing part 36 of the advertisement supply server 18, when it receives a request of reproducing an advertisement, activates the advertisement distributing part 38 and the advertisement distributing part 38 selects an advertisement to be distributed. The activated advertisement distributing part 38 also increases the count (i.e., distribution count), which shows the number of distribution that is connected with corresponding advertisement contents in the advertisement DB in accordance with step 309. Then, the advertisement distribution part 38 starts distributing advertisement contents in accordance with steps 310 and 311. Thus, on the screen of the display apparatus of the client machine 14, there is displayed a window 802 that contains advertisement contents as shown in FIG. 8A, and the window 802 is displayed on the normal window 801, which shows mid-flow of download. In this case, it is preferable that the advertisement contents are displayed by so-called "streaming reproduction" in the window 802.

Figure 4:
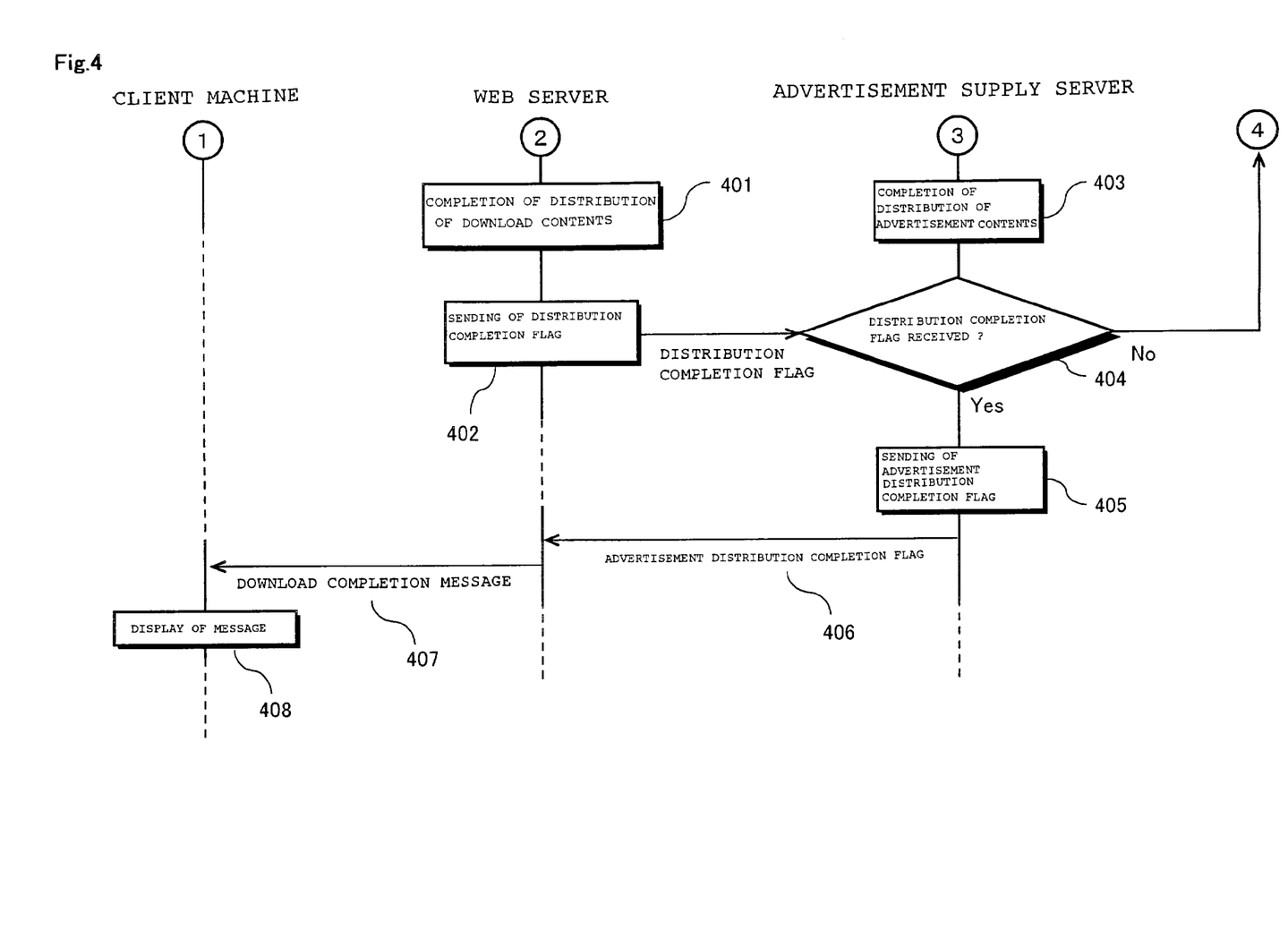
FIG. 4 is a flow chart that shows distribution of contents to be downloaded and advertising contents and normal completion in accordance with an embodiment of the invention.

FIG. 4 is a flow chart that shows distribution of download contents, and advertisement contents, and normal termination. When the distribution of download contents is completed in accordance with step 401, a distribution completion flag is sent to the advertisement supply server 18 from the web server 16 in accordance with step 402. The advertisement supply server 18, when the distribution of the advertisement contents is completed (see step 403), judges whether it received the distribution completion flag from the web server 16 in accordance with step 404. In the case where the situation is judged to be NO at step 404, the routine/program returns to step 309. In this case, the same contents as the advertisement contents may be reproduced again, or other contents may be selected and reproduced for download. For example, in the case where the capacity of a download file is large, reproduction of advertisement contents is repeated until such time that the corresponding download has completed.

Figure 8B:
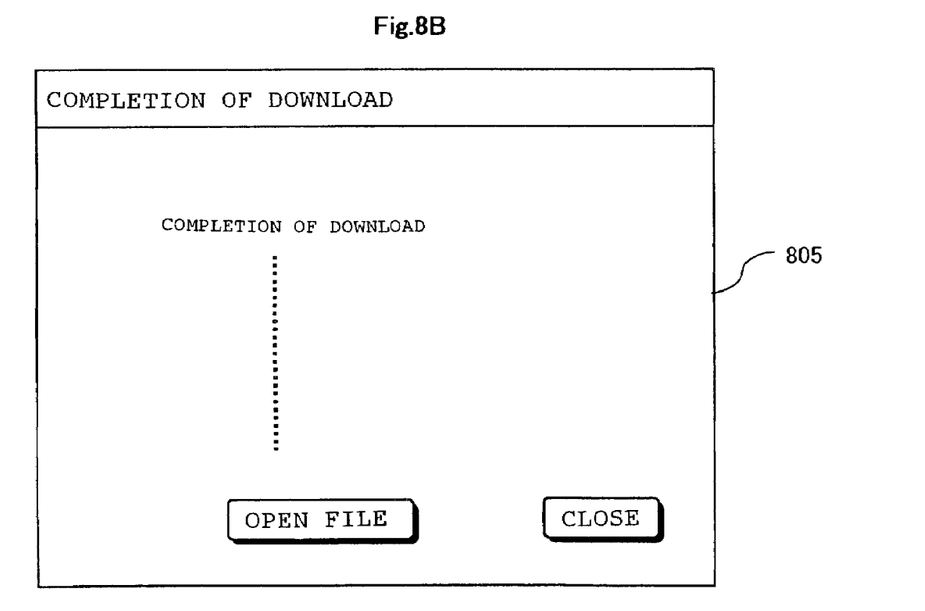

On the other hand, in the advertisement supply server 18, when the situation is judged to be that the distribution completion flag has been received from the web server 16 (i.e., YES at step 404), an advertisement distribution completion flag is sent to the web server 16 in accordance with steps 405 and 406. The web server 16, in response to reception of the advertisement distribution completion flag, sends a download completion message to the client machine 14 in accordance with step 407. Thus, as shown in FIG. 8B, displayed on the screen of the display apparatus of the client machine 14 is a window 805, which contains a message showing download completion in accordance with step 408. Thus, download is complete.

Figure 5:
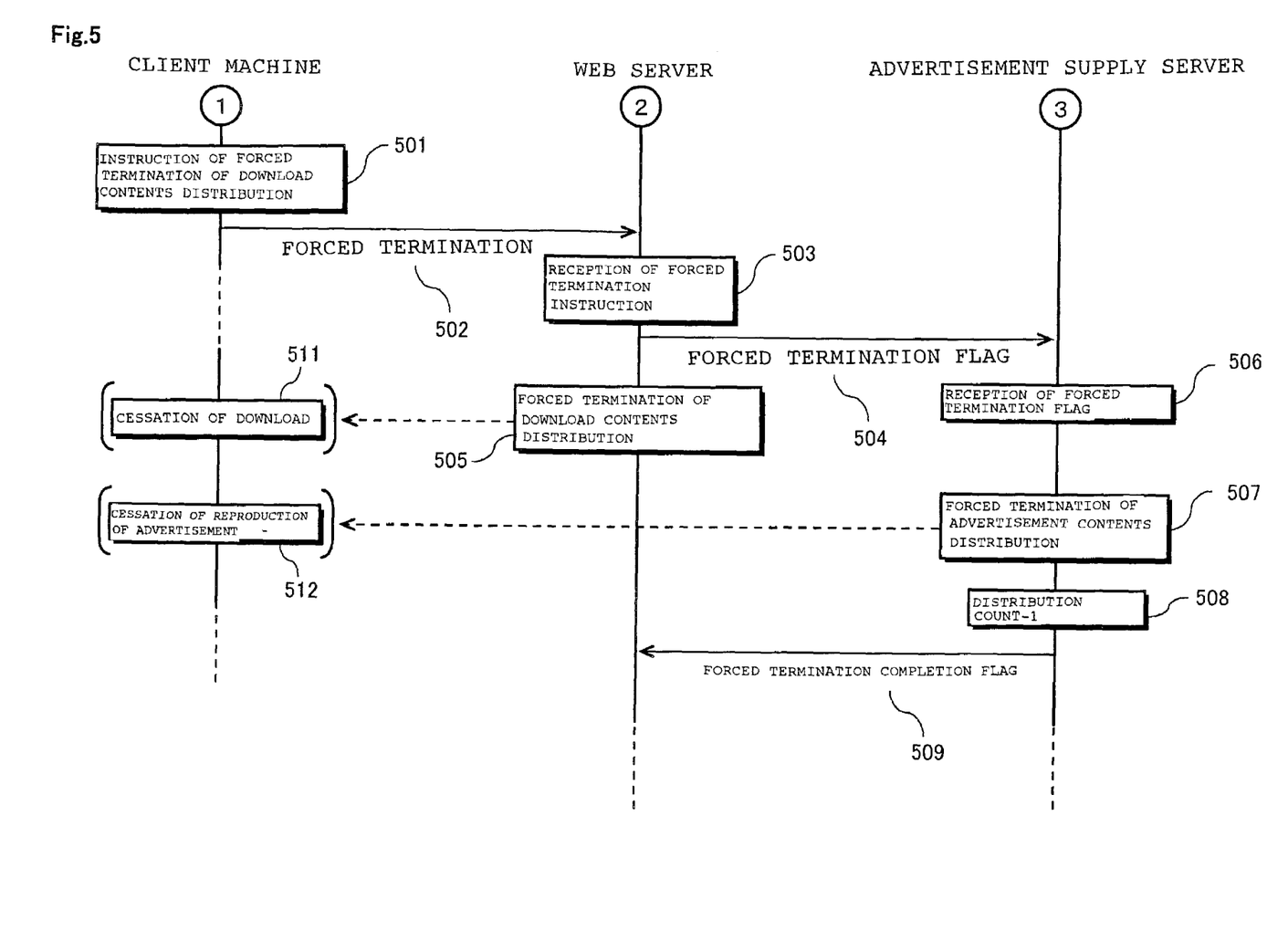
FIG. 5 is a flow chart that shows processing that occurs due to a forced termination of download in accordance with an embodiment of the invention.

In contrast, processing in the case of forced termination during download will be explained as follows. FIG. 5 is a flow chart that shows processing that occurs due to forced termination of download. In the window 801, shown in FIG. 8A, for example, in the case where a user operates the input apparatus of client machine 14 to turn on a termination button (for example, see numeral 803) in accordance with step 501, a command of forced termination of download is sent to the web server 16 in accordance with step 502. In the web server 16, the command of forced termination of download is supplied to the forced termination processing part 32 in accordance with step 503, and the forced termination processing part 32, in response to this command, sends a forced termination flag of advertisement contents distribution to the advertisement supply server 18 in accordance with step 504, and it instructs cessation of distribution of download contents to the contents distribution part 28 in accordance with step 505. Thus, download in the client machine 14 is ceased (see, step 511).

Also in the advertisement supply server 18, when the forced termination flag is received in accordance with step 506, the forced termination processing part 42, in response to receiving this flag, instructs cessation of distribution of advertisement contents to the advertisement distributing part 38 in accordance with step 507. Consequently, reproduction of advertisement contents in the client machine 14 is ceased (see, step 512). Then, in accordance with instruction of the forced termination processing part 42, the advertisement distributing part 38 decreases the distribution count that is associated with distributed advertisement contents in accordance with step 508. Then, a forced termination completion flag, which shows completion of processing involving the forced termination, is sent to the web server 16 in accordance with step 509.

Figure 6:
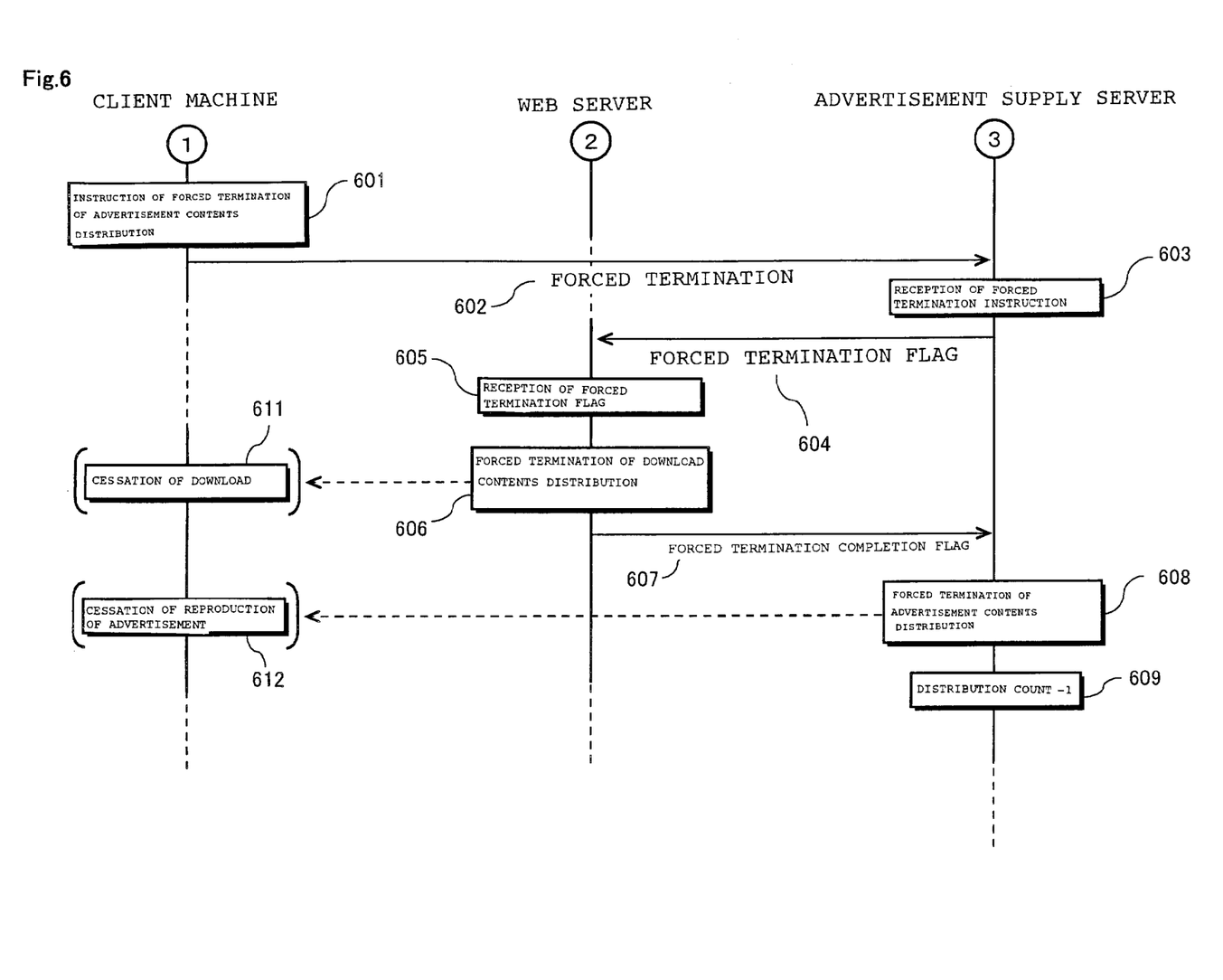
FIG. 6 is a flow chart that shows processing that occurs due to a forced termination of advertisement distribution in accordance with an embodiment of the invention.

FIG. 6 is a flow chart showing processing that occurs due to forced termination of advertisement distribution. For example, in window 802 for reproduction of advertisement contents, as shown in FIG. 8A, when a user operates the input apparatus of the client machine 14 to turn on a termination button (see, numeral 804) in accordance with step 601, a forced termination command of advertisement contents distribution is sent to the advertisement supply server 18 in accordance with step 602. In the advertisement supply server 18, the forced termination command is supplied to the forced termination processing part 42 in accordance with step 603, and the forced termination processing part 32, in response to receipt of this forced termination command, sends a forced termination flag of download to the web server 16 in accordance with step 604, and instructs distribution termination of advertisement contents to the advertisement distributing part 38.

In the web server 18, when the forced termination flag is received in accordance with step 605, the forced termination processing part 32, in response to receipt of this flag, instructs cessation of distribution of download contents to the contents distributing part 28 in accordance with step 606. Thus, download to the client machine 14 is ceased (see, step 611). The forced termination completion flag, which shows completion of processing involving forced termination, is sent to the advertisement supply server 18 in accordance with step 607.

Furthermore, in the advertisement supply server 18, the advertisement distributing part 38 also ceases distribution of advertisement contents in accordance with step 608. Consequently, reproduction of advertisement contents in the client machine is ceased (see, step 612). Furthermore, in accordance with an instruction of the forced termination processing part 42, the advertisement distributing part 38 decreases the distribution count that is connected with distributed advertisement contents in accordance with step 609.

Thus, in this embodiment, when downloading contents, such as motion pictures, still pictures and music, at the same time an advertisement is distributed and reproduced for the client machine. Advertisements are distributed until completion of download. Furthermore, with respect to each distribution of advertisement contents, the count is increased so that it becomes possible to account correctly the distribution number of the advertisement.

Furthermore, according to this embodiment of the invention, when distribution of advertisement contents is forcibly terminated during download, download is ceased. Accordingly, a user who requests download of contents views advertisement contents at least during downloading. In this manner, it becomes possible to reliably present advertisement to users and to heighten the effect of advertisement.

By using the distribution count, it becomes possible to optimize accounting to sponsors. That is, in the case that download and reproduction of advertisement are forcibly terminated during reproduction of advertisement, this terminated distribution is not included in the count so that it becomes possible to count only distribution that has been reproduced properly to completion.

The present invention is not limited to the above-described embodiment and various modifications may be possible within the scope of the invention described by the appended claims, and it goes without saying that those modifications are covered by the scope of the invention.

Figure 9:
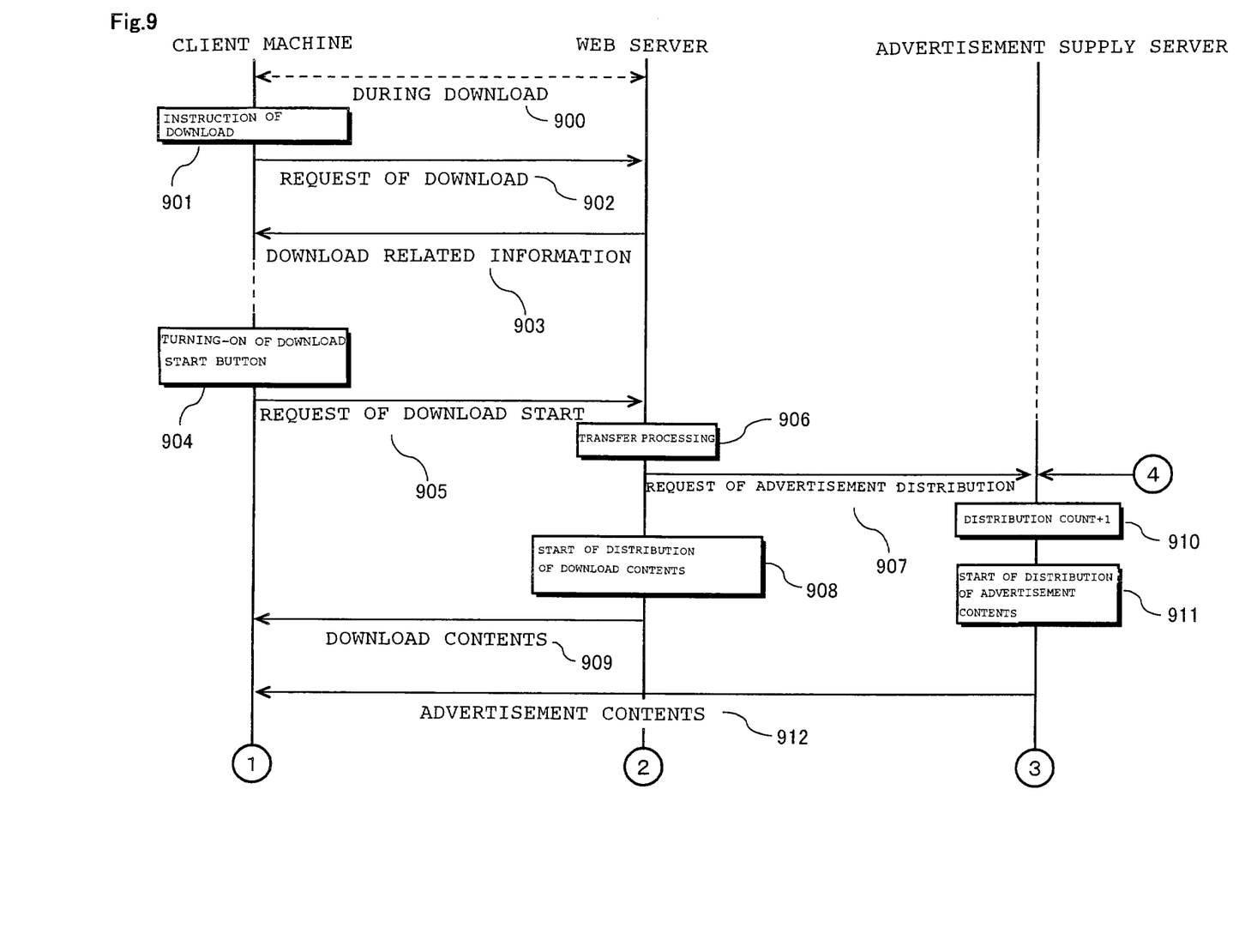
FIG. 9 is a flow chart that shows a data flow from a download request from the client machine to start of contents distribution in accordance with another embodiment of the invention.

In another embodiment, a plurality of linked addresses are designated by use of extension links of XML; however, the present invention is not limited to this example, and it may be structured so that, after a necessary command is supplied once to the web server, the necessary command in the web server is sent to the advertisement supply server and, thus, advertisement contents are distributed. FIG. 9 is a flow chart that shows a data flow from download request by the client machine until start of contents distribution as one such example.

In the embodiment shown in FIG. 9, step 900 to step 904 correspond to steps 300 to 304 shown in FIG. 3, respectively. In the example of FIG. 9, when a download start request is sent to the web server 16 in accordance with step 905, the web server 16 carries out transfer processing for distributing advertisement contents to the client machine 14, which is requesting download, in accordance with step 906, and an advertisement distribution request is sent to the advertisement supply server 18 to distribute advertisements to the client machine 14 in accordance with step 907. Processing after this step 907, (i.e., step 908 to step 912), correspond to steps from step 307 to step 311 shown in FIG. 3, respectively. It is also possible to distribute advertisement contents in a similar manner even by use of such method shown in FIG. 9.

Furthermore, in the foregoing embodiment, advertisement contents are reproduced during download of contents, such as motion pictures, still pictures and music; however, it goes without saying that contents to be downloaded are not limited to those described above and documents, for example, may be used as such contents.

Furthermore, in the foregoing embodiment, the web server 16 and the advertisement supply server 18 are connected to each other through the Internet 12; however, the invention is not limited to this connection and these functions may be realized in a single server.

In addition, in this specification, a function of one means may be realized by more than two physical means, or functions of more than two means may be realized by one physical means.

According to the present invention, it is possible to present advertisements properly to users and to provide a data communication system that is attractive to sponsors and side administrators.

What is claimed is:

1. A distributing method for downloading contents to a client machine connected to a network, in a system in which a web server for downloading contents to the client machine of a user and an advertisement supply server for distributing advertisement contents are connected through the network, the method comprising the steps of:

in the web server, sending necessary related information, including links for download of contents and for advertisement reproduction with regard to the client machine, in accordance with a download request of the client machine;

in the client machine, requesting start of download to the web server by using a link contained in the related information, and simultaneously with the request of start of download, requesting start of advertisement reproduction to the advertisement supply server by using another link contained in the related information;

in the web server, distributing designated predetermined contents to the client machine in response to the download start request of the client machine;

in the advertisement supply server, distributing predetermined advertisement contents in response to the request for advertisement reproduction in order to have advertising contents reproduced in the client machine;

in the advertisement supply server, terminating distribution of advertisement contents to the client machine in response to receipt of an instruction of forced termination of advertisement contents distribution by the advertisement supply server from the client machine, and for sending a first forced termination flag that shows forced termination of distribution of the advertisement contents to the web server; and in the web server, ceasing distribution of contents in response to reception of the first forced termination flag.

2. The distributing method according to claim 1, further comprising the steps of:

in the web server, terminating distribution of contents to the client machine in response to an instruction from the client machine of forced termination of contents distribution by the web server, and sending a second forced termination flag that shows forced termination of distribution of contents to the advertisement supply server; and in the advertisement supply server, ceasing distribution of advertisement contents in response to reception of the second forced termination flag.

3. The distributing method according to claim 1, further comprising the steps of:

in the advertisement supply server, increasing a count value that shows a number of distribution of advertisement contents on occasion of distribution of corresponding advertisement contents; and decreasing the count value, in response to reception of forced termination of distribution of the advertisement contents, or reception of a second forced termination flag.

4. The distributing method according to claim 1, further comprising the steps of:

in the web server, sending a distribution completion flag that shows distribution completion of contents to the advertisement supply server;

in the advertisement supply server, detecting accession of the distribution completion flag when distribution of certain advertisement contents is completed; and sending same, or other, advertisement contents to the client machine when the distribution completion flag is not reached.

5. The distributing method according to claim 1, wherein the step of sending related information contains a step of sending information that designates a plurality of linked addresses, and the distributing method further comprises the steps of in the client machine, requesting start of download to the web server; and requesting distribution of advertisement contents to the advertisement supply server.

6. The distributing method according to claim 1, further comprising the step of:

in the web server, requesting distribution of advertisement contents to the client machine from the advertisement supply server in response to request of download start from the client machine.

7. The distributing method according to claim 1, further comprising the step of:

displaying on a screen of a display apparatus of the client machine a first window comprising advertising contents, wherein the first window is displayed on a second window that shows download mid-flow.

8. A distributing program stored on a web server readable medium for activating a web server, in order to download contents to a client machine connected to a network, in a system in which a web server for downloading contents to the client machine of a user and an advertisement supply server for distributing advertisement contents are connected through the network, wherein the distributing program has the web server execute the following steps:

sending necessary related information, including links for download of contents and for advertisement reproduction with regard to the client machine, in accordance with a download request of the client machine;

receiving a request of download start from the client machine using a link contained in the related information, and simultaneously with the request of download start by the client machine, the client machine requests start of advertisement reproduction to the advertisement supply server by using another link contained in the related information;

sending designated predetermined contents to the client machine in response to the request of download start by the client machine; and ceasing distribution of contents in response to reception of a first forced termination flag, and when the advertisement supply server receives the first forced termination flag showing forced termination of advertisement contents, responding to an instruction of forced termination of distribution of advertisement contents received from the client machine, and the advertisement supply server distributes advertisement contents to the client machine by sending contents by via web server.

9. The distributing program according to claim 8, wherein the distributing program has the web server further execute the step of terminating distribution of contents by the web server to the client machine in response to an instruction of forced termination of distribution of contents from the client machine, and sending to the advertisement supply server a second forced termination flag showing forced termination of distribution of contents.

10. A distributing program stored on a web server readable medium for activating a web server, in order to download contents to a client machine connected to a network, in a system in which a web server for downloading contents to the client machine of a user and an advertisement supply server for distributing advertisement contents are connected through the network, wherein the distributing program has the web server execute:

a step of sending necessary related information, including links for download of contents and for advertisement reproduction with regard to the client machine, in accordance with a download request of the client machine;

a step of receiving a request of download start from the client machine by using a link contained in the related information, and simultaneously with the request of download start by the client machine, the client machine requests start of advertisement reproduction to the advertisement supply server by using another link contained in the related information;

a step of sending designated predetermined contents to the client machine in response to the request of download start by the client machine; and a step of ceasing distribution of contents in response to reception of a first forced termination flag, and when the advertisement supply server receives the first forced termination flag showing forced termination of advertisement contents, responding to an instruction of forced termination of distribution of advertisement contents received from the client machine, and the advertisement supply server distributes advertisement contents to the client machine by sending contents via the web server.

11. The distributing method according to claim 7, wherein advertising contents displayed by the first window are displayed by streaming reproduction.

12. A distributing method for downloading contents to a client machine connected to a network, in a system in which a web server for downloading contents to the client machine of a user and an advertisement supply server for distributing advertisement contents are connected through the network, the method comprising:

in the web server, a step of sending necessary related information, including links for download of contents and for advertisement reproduction with regard to the client machine, in accordance with a download request of the client machine;

in the client machine, a step of requesting start of download to the web server by using a link contained in the related information, and simultaneously with the request of start of download, requesting start of advertisement reproduction to the advertisement supply server by using another link contained in the related information;

in the web server, a step of distributing designated predetermined contents to the client machine in response to the download start request of the client machine;

in the advertisement supply server, a step of distributing predetermined advertisement contents in response to the request for advertisement reproduction in order to have advertising contents reproduced in the client machine;

in the advertisement supply server, a step of terminating distribution of advertisement contents to the client machine, in response to receipt of an instruction of forced termination of advertisement contents distribution by the advertisement supply server from the client machine, and for sending a first forced termination flag that shows forced termination of distribution of the advertisement contents to the web server; and in the web server, a step of ceasing distribution of contents in response to reception of the first forced termination flag.

* * * * *